(12) United States Patent
    Mohiuddin Khan

(10) Patent No.: US 10,664,971 B2
(45) Date of Patent: May 26, 2020

(54) METHOD AND DEVICE FOR DETECTING REGION OF INTEREST BASED ON IMAGES

(71) Applicant: WIPRO LIMITED, Bangalore (IN)

(72) Inventor: Ghulam Mohiuddin Khan, Bangalore (IN)

(73) Assignee: Wipro Limited, Bangalore (IN)

( * ) Notice: Subject to any disclaimer, the term of this patent is extended or adjusted under 35 U.S.C. 154(b) by 180 days.

(21) Appl. No.: 15/884,419

(22) Filed: Jan. 31, 2018

(65) Prior Publication Data

US 2019/0188854 A1    Jun. 20, 2019

(30) Foreign Application Priority Data

Dec. 19, 2017 (IN) .............................. 201741045694

(51) Int. Cl.
| | |
|---|---|
| *G06K 9/00* | (2006.01) |
| *G06T 7/11* | (2017.01) |
| *G06K 9/66* | (2006.01) |
| *G06T 7/13* | (2017.01) |
| *G06N 20/00* | (2019.01) |
| *G06K 9/46* | (2006.01) |
| *G06K 9/32* | (2006.01) |
| *G06Q 30/02* | (2012.01) |

(52) U.S. Cl.
    CPC .............. *G06T 7/11* (2017.01); *G06K 9/3241* (2013.01); *G06K 9/4642* (2013.01); *G06K 9/66* (2013.01); *G06N 20/00* (2019.01); *G06T 7/13* (2017.01); *G06K 9/4604* (2013.01); *G06Q 30/0241* (2013.01); *G06T 2210/12* (2013.01)

(58) Field of Classification Search
    None
    See application file for complete search history.

(56) References Cited

U.S. PATENT DOCUMENTS

| | | | |
|---|---|---|---|
| 2008/0174815 A1* | 7/2008 | Komaki ................ | G06F 17/241 358/1.15 |
| 2009/0059270 A1 | 3/2009 | Opalach et al. | |
| 2012/0323620 A1 | 12/2012 | Hofman et al. | |
| 2014/0301607 A1* | 10/2014 | Anderson .......... | G06K 9/00657 382/110 |
| 2016/0171707 A1* | 6/2016 | Schwartz ........... | G06K 9/00201 382/180 |

FOREIGN PATENT DOCUMENTS

EP      3 211 580      8/2017

* cited by examiner

*Primary Examiner* — Hadi Akhavannik
(74) *Attorney, Agent, or Firm* — Finnegan, Henderson, Farabow, Garrett & Dunner, LLP

(57) ABSTRACT

A method and device for detecting region of interest based on images is disclosed. The method includes creating, by a region detection device, at least one histogram associated with at least one storage area within an image captured for a predetermined location. The method further includes identifying, by the region detection device, a plurality of boundaries within the at least one storage area based on the at least one histogram. The method includes detecting, by the region detecting device, at least one region of interest based on the plurality of boundaries.

9 Claims, 5 Drawing Sheets

US 10,664,971 B2

METHOD AND DEVICE FOR DETECTING REGION OF INTEREST BASED ON IMAGES

TECHNICAL FIELD

This disclosure relates generally to detecting region of interest and more particularly to method and device for detecting region of interest based on images.

BACKGROUND

In retail stores, fixtures are arranged in a way that enhances visual merchandising, in order to improve sales and profits for a particular brand or company. Thus compliance at brand, product, and category level plays an important role in overall profits. Companies pay for prime spaces on fixtures and major share of shelf space. These are of huge importance for different competing companies and thus they spend huge money for planogram compliance supervisions. Representatives from such companies visit stores to manually supervise compliance. However, manual supervision is not only expensive, it is time taking as well.

Some conventional systems use mobile cameras or CCTV camera to capture images in order to automatically process and analyze various Key Performance Indicators (KPIs) to check planogram compliance. Product recognition plays an important role in computing these KPI's. However, nowadays product wrappers and packet colors change quite frequently along with new variants being introduced on regular basis to counter rivals. Thus, in order to recognize a product, it is important to first accurately determine products' region of interest, i.e., the region where products are placed on a fixture to enable visual merchandizing.

Some conventional systems provide for detecting a product region using pre-defined fixture information. However, this method is not a scalable solution since it pre-defined fixture information has to be captured for different stores. It is not feasible to manually calculate and store fixture information for all kinds of fixtures in different stores. In addition, this method is not dynamic in nature and requires an immediate update, whenever a new fixture is added in a given store.

SUMMARY

In one embodiment, a method for detecting regions of interest from images. The method includes creating, by a region detection device, at least one histogram associated with at least one storage area within an image captured for a predetermined location. The method further includes identifying, by the region detection device, a plurality of boundaries within the at least one storage area based on the at least one histogram. The method includes detecting, by the region detecting device, at least one region of interest based on the plurality of boundaries.

In another embodiment, a region detection device for detecting regions of interest from images is disclosed. The region detection device includes at least one camera, a processor communicatively coupled the at least one camera, and a memory communicatively coupled to the processor, wherein the memory stores processor instructions, which, on execution, causes the processor to create at least one histogram associated with at least one storage area within an image captured for a predetermined location. The processor instructions further causes the processor to identify a plurality of boundaries within the at least one storage area based on the at least one histogram and detect at least one region of interest based on the plurality of boundaries.

In yet another embodiment, a non-transitory computer-readable storage medium is disclosed. The non-transitory computer-readable storage medium has instructions stored thereon, a set of computer-executable instructions causing a computer comprising one or more processors to perform steps that include creating at least one histogram associated with at least one storage area within an image captured for a predetermined location. The steps further include identifying a plurality of boundaries within the at least one storage area based on the at least one histogram. The steps include detecting at least one region of interest based on the plurality of boundaries.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
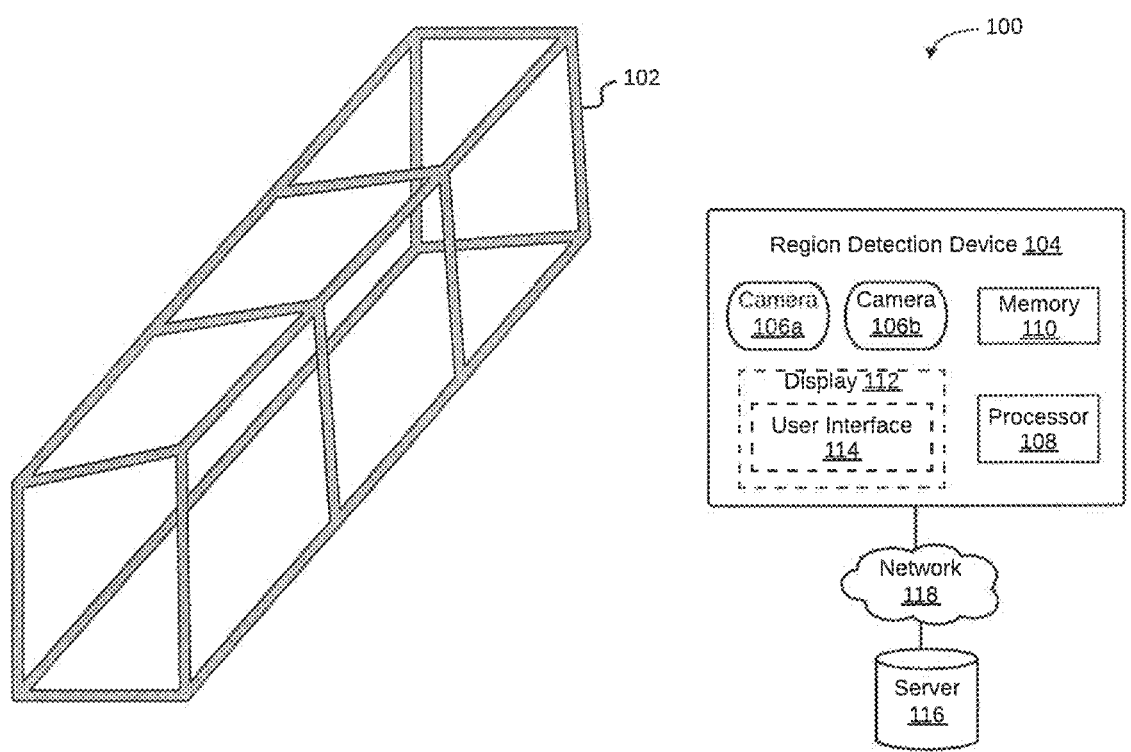
FIG. 1 is a block diagram illustrating an environment in which various embodiment may be employed.

Additional illustrative embodiments are listed below. In one embodiment, an environment 100 (that is exemplary) in which various embodiments may be employed is illustrated in FIG. 1. Environment 100 includes a storage area 102 within a location. It will be apparent to a person skilled in the art that environment 100 may include multiple such storage areas and only one storage area 102 is depicted for illustrative purposes only. Examples of storage area 102 may include, but are not limited to fixtures, frames, shelves, racks, cabinets, or boxes. The location, for example, may be a shopping mall, a retail store, or a data center. Thus, storage area 102 may be used to store or place various products or objects. By way of an example, when the location is a retail shop, storage area 102 may be a fixture that displays products or merchandize of a particular brand.

In order to determine whether a given product or object is placed at a desired place within storage area 102, a region detection device 104 is used to capture images of storage area 102. Examples of region detection device 104 may include one or more of, but is not limited to a laptop, a CCTV camera, a smart phone, phablet, a tablet, or a digital camera. Based on the captured images, region detection device 104 determines the overall structure of storage area 102 and a plurality of boundaries within storage are 102 in order to determine one or more region of interests within storage area 102. To this end, region detection device 104 includes a plurality of cameras (for example, a camera 106*a* and a camera 106*b*) to capture an image of the location and storage area 102. The plurality of cameras may be stereo cameras.

In order to process the captured image, region detection device 104 includes a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM). Memory 110 further includes various modules that enable detection of region of interest from the captured image. These modules are explained in detail in conjunction with FIG. 2. Region detection device 104 may further include a display 112 having a User Interface (UI) 114 that may be used by a user or an administrator to provide various inputs to region detection device 104. Display 112 may further be used to display result of detecting region of interests in storage area 102.

The functionality of various modules within memory 110 may alternatively be configured within a server 116, which is connected to region detection device 104 via network 118. Network 118 may be a wired or a wireless network and the examples may include, but are not limited to, the Internet, Wireless Local Area Network (WLAN), Wi-Fi, Long Term Evolution (LTE), Worldwide Interoperability for Microwave Access (WiMAX), and General Packet Radio Service (GPRS). In this case, region detection device 104 may only capture images for storage area 102 and may later transmit them to server 116 for further processing. It will be apparent to a person skilled in the art that server 116 may be replaced by any computing device (not shown in FIG. 2), for example, a laptop, desktop, a smart phone, or a tablet.

Figure 2:
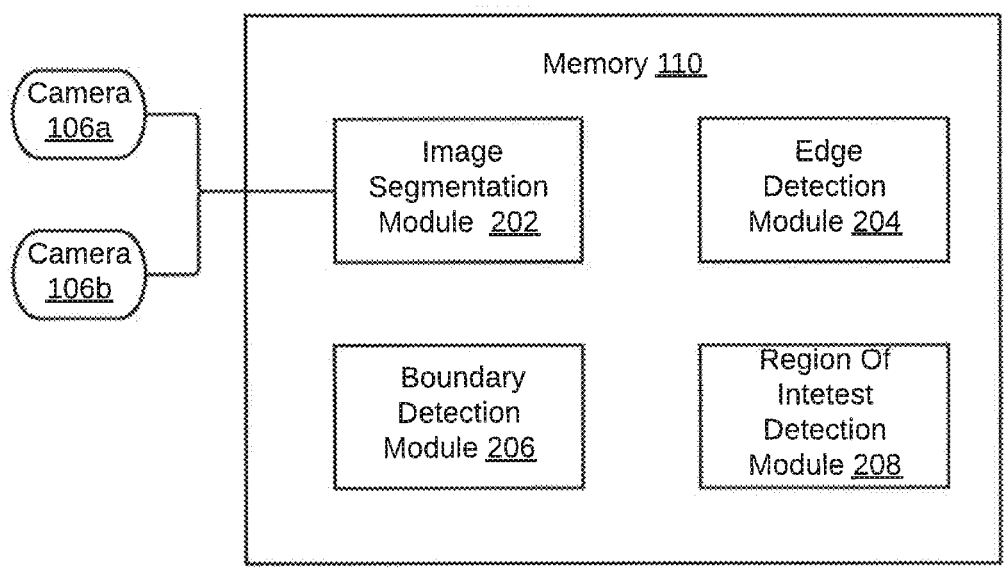
FIG. 2 is a block diagram illustrating various modules within a memory of a region detection device configured to detect region of interest for a given location, in accordance with an embodiment.

Referring now to FIG. 2, a block diagram of various modules within memory 110 of region detection device 104 configured to detect region of interest in a given location is illustrated, in accordance with an embodiment. Memory 110 may be in communication with camera 106*a* and camera 106*b*. When one or more of these cameras capture an image of a storage area, various modules within memory 110 process the image to detect region of interest within the storage area.

Memory 110 includes an image segmentation module 202, an edge detection module 204, a boundary detection module 206, and a region of interest detection module 208. Each of these module communicate among each other by employing connection protocols, which may include, but are not limited to Serial Advanced Technology Attachment (SATA), Integrated Drive Electronics (IDE), IEEE 1394, Universal Serial Bus (USB), fiber channel, Small Computer Systems Interface (SCSI), STD Bus, RS232, RS-422, RS-485, I2C, SPI, Microwire, 1-Wire, IEEE 1284, Intel Quick Path Interconnect, InfiniBand, PCIe etc using standard data connections means such as wireless or wired.

Once an image captured by one or more of cameras 106*a* and 106*b* are received by memory 110, image segmentation module 202 identifies one or more storage areas from the image based on a machine learning model. Thereafter, edge detection module 204 identifies outer edges of each of the one or more storage areas identified in the image. This is further explained in detail in conjunction with FIG. 3 and FIG. 4.

Boundary detection module 206 then creates one or more histograms for the one or more storage areas. Based on the one or more histograms, boundary detection module 206 identifies a plurality of boundaries within the one or more storage areas. Region of interest detection module 208 then detects one or more regions of interest based on the plurality of boundaries. This is further explained in detail in conjunction with FIG. 3.

Figure 3:
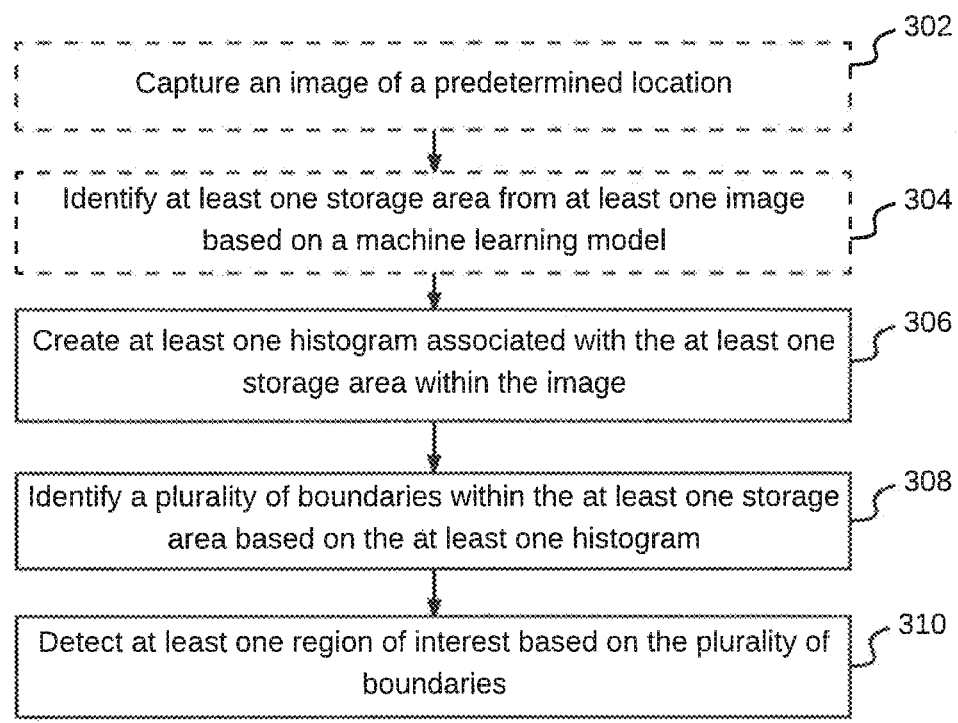
FIG. 3 illustrates a flowchart of a method for detecting regions of interest from one or more images, in accordance with an embodiment.

Referring now to FIG. 3, a flowchart of a method for detecting regions of interest from one or more images is illustrated, in accordance with an embodiment. At step 302, region detection device 104 may capture an image of a predetermined location. The predetermined location, for example, may be a shopping mall, a retail store, or a data center, where objects of interest (for example, products or merchandise) are supposed to be organized in a specific manner. By way of an example, a particular company may want its product to be placed in a particular area and position in shelves in a retail store. For example, a company may want to place its products near billing counter or near entrance of the retail store, such that, these products catch a customer's attention while entering and exiting the retail store.

Region detection device 104 may be a smart phone or a digital camera held by a person. Alternatively, region detection device 104 may be a CCTV camera installed within the predetermined location. Once the image is captured, region detection device 104, at step 304, may identify one or more storage areas from the image, based on a machine learning model. The one or more storage areas, for example, may include, but are not limited to of fixtures, frames, shelves, racks, cabinets, or boxes. In order to identify the one or more storage areas from the background within the image, the image may be segmented using the machine learning model. The machine learning model may include images of various types of storage areas (for example, fixtures) in various types of background locations (for example, a retail shop) with different lighting condition, scales, colors, or background clutter. This is further explained in detail in conjunction with FIG. 4.

Once the one or more storage areas within the image are identified, region detection device 104 may plot one or more histograms associated with the one or more storage areas within the image captured for the predetermined location, at step 306. The one or more histograms may include one or more of, but are not limited to a vertical histogram, a diagonal histogram, or a horizontal histogram. Based on the one or more histograms, region detection device 104 identifies a plurality of boundaries within the one or more storage areas at step 308. The plurality of boundaries may be identified by applying a line detection algorithm on the one or more histograms. The plurality of boundaries helps in identifying the overall structure of the one or more storage areas. A boundary within the plurality of boundaries may be one of a horizontal or a vertical bound of a storage area.

By applying the line detection algorithm, approximate location of horizontal and vertical boundaries of a storage area, for example, a fixture, may be determined. Any line that has an orientation more than a predefined threshold may be ignored. By way of an example, in order to detect region of interest, frontal images of a fixture are captured. The fixture rack will have an orientation of zero degrees for horizontal bounds and 90 degrees for vertical bounds and the predefined threshold may be fixed at a +/−five degrees in either direction for both vertical and horizontal bounds. Thus, a boundary having an orientation between 85 and 95 degrees may be considered as a vertical boundary and a boundary having orientation between −5 and +5 degrees may be considered as horizontal boundary of the fixture.

In an embodiment, once probable boundaries, for example, vertical and horizontal line candidates have been identified, non-maximal separation may be used to remove duplicate boundaries detected for a particular storage area. By way of an example, for a fixture within a retail store, when rack edges are detected to be very close to each other, one of the rack edges is removed as a duplicate. Once duplicates are removed, final approximations of boundaries of the storage area are obtained. Thereafter, horizontal histograms (row that includes maximum number of white pixels) are used to accurately locate horizontal boundaries of the storage area and vertical histograms (column that include maximum number of white pixels) are used to accurately locate vertical boundaries of the storage area. In case of presence of a diagonal boundary, a diagonal histogram may also be used.

Symmetry within a particular storage area and heuristics may also be used to avoid any false detection of boundaries. As a result, the plurality of boundaries of the storage are accurately identified. In other words, the overall structure of the storage area is accurately determined. By way of an example, for a fixture within a retail store, vertical and horizontal boundaries of the fixture racks are accurately identified based on the above discussed method. As a result, the overall number of racks within the fixture, their horizontal and vertical bounds, and overall fixture structure is also identified.

Based on the plurality of boundaries identified at step 308, region detection device 104, may detect one or more region of interests at step 310. By way of an example, a region of interest in context of a retail store may be a bounding box within which one or more products or merchandize. By way of another example, a region of interest in context of a data center may include a bounding box that include storage drives or servers. The one or more region of interests may be detected based on intersection of the plurality of boundaries. After the overall structure of the storage area including the plurality boundaries within the storage area are obtained, the one or more regions of interest are estimated based on intersection of the plurality of boundaries.

By way of an example, in case of a fixture in a retail store, after overall fixture structure including stack of horizontal and vertical racks is obtained, one or more region of interests where the products may be placed are estimated between each set of two horizontal and two vertical racks. There may be multiple vertical sets between a horizontal set and thus we slide through and estimate region of interest for each such vertical set arrangement. While estimating the one or more region of interests and its bounding box, a buffer for the upper horizontal rack may be considered. The buffer compensates for presence of a gap between top of a product placed in the rack and the upper horizontal rack. Once the one or more regions of interest have been identified, one or more products within the accurate region of interest are also identified based on a template matching method.

Figure 4:
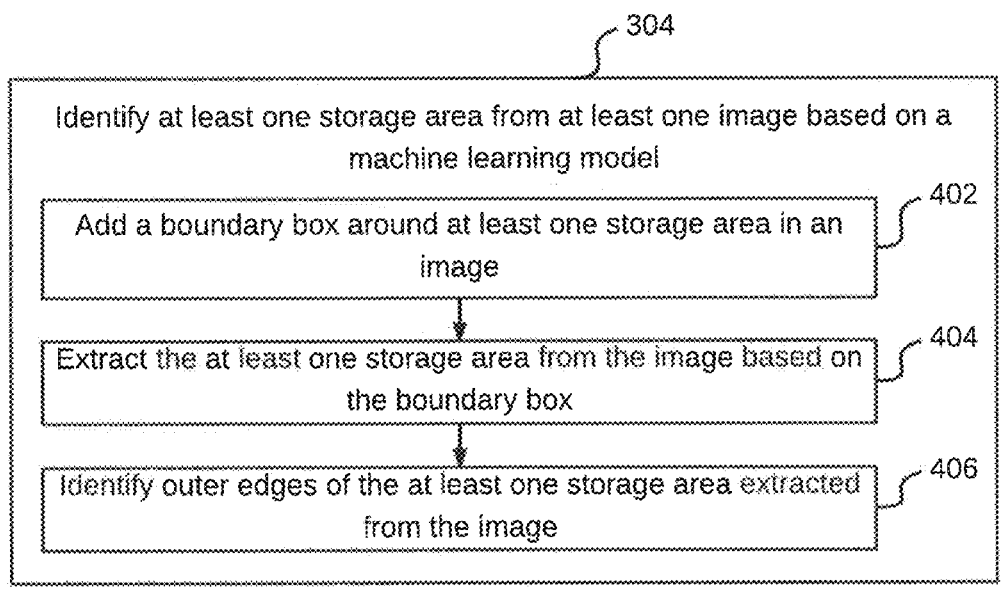
FIG. 4 illustrates a flowchart of a method of identifying at least one storage area from at least one image based on a machine learning model, in accordance with another embodiment.

Referring now to FIG. 4, a flowchart of a method of identifying one or more storage areas from an image based on a machine learning model is illustrated, in accordance with another embodiment. In order to identify the one or more storage areas from the image, at step 402, a boundary box is added around the one or more storage areas in the image, by the machine learning model. The segmented image of a storage area enables approximation of product location within the storage area. When multiple storage areas are detected in the image, then a boundary box is added around each storage areas. Thus, coordinates of boundary boxes around all storage areas in the image are processed separately for products.

Based on the boundary box, the one or more storage areas are extracted from the image, at step 404. Adding the boundary box around the one or more storage areas helps in segmenting it from rest of the background in the image. Thereafter, at step 406, outer edges of the one or more storage areas extracted from the image. Thus one or more storage areas within the image are identified and histograms are created for them. This has been already been explained in detail in conjunction with FIG. 3.

Figure 5:
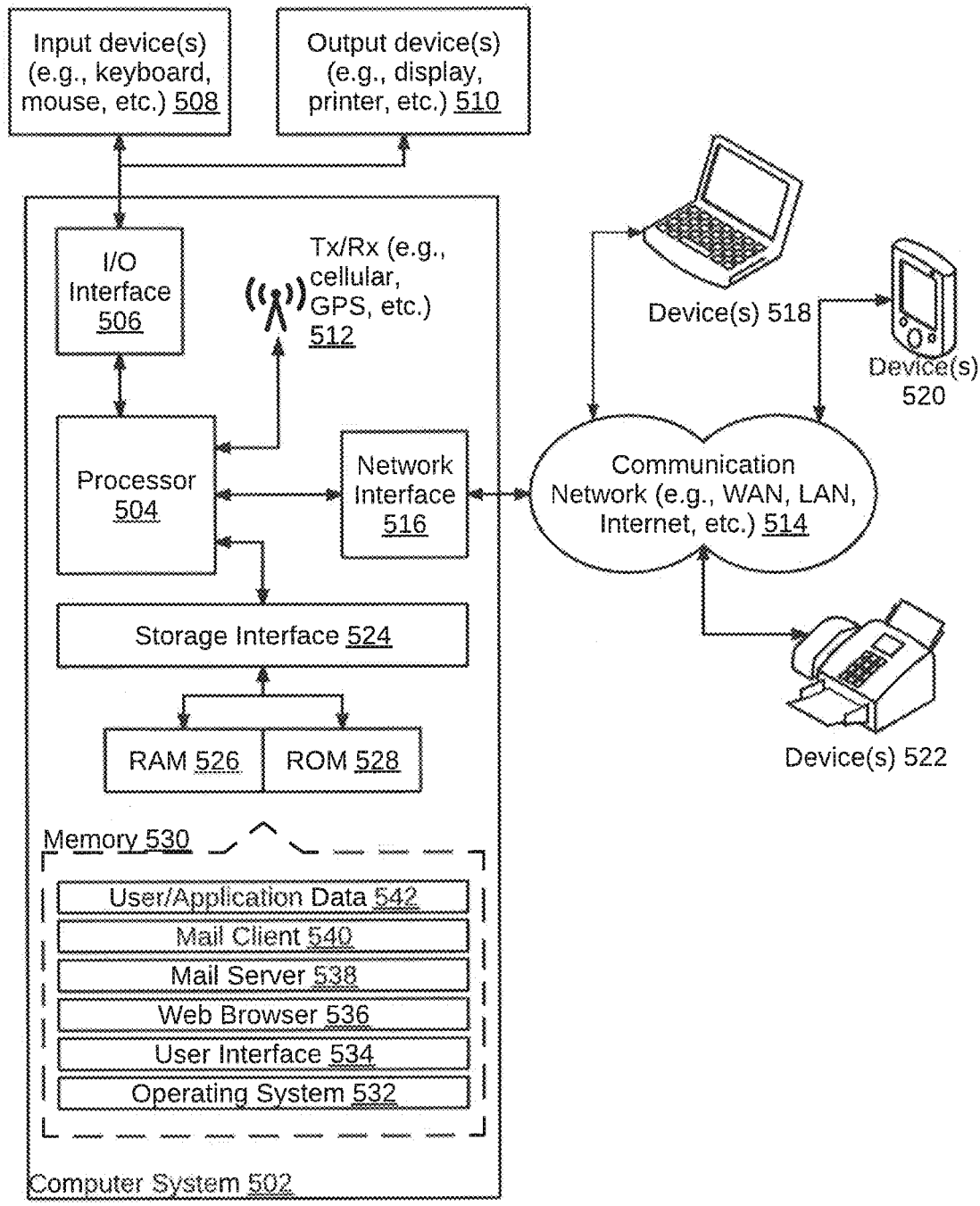
FIG. 5 illustrates a block diagram of an exemplary computer system for implementing various embodiments.

FIG. 5 is a block diagram of an exemplary computer system for implementing various embodiments. Computer system 502 may include a central processing unit ("CPU" or "processor") 504. Processor 504 may include at least one data processor for executing program components for executing user- or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800 transceiver, or the like), providing IEEE 802.11a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (e.g., any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for detecting region of interest based on images. The method automatically detects boundaries of storage areas, for example, retail fixtures, and thus overall structure of the storage area without relying on pre-stored information regarding various storage areas. The method can be used to detect a storage area of any size or shape. Moreover, new type of storage areas introduced into different locations can be easily detected without requiring an information update regarding the new storage area.

The specification has described method and device for detecting region of interest based on images. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting regions of interest associated with at least one product from at least one image, the method comprising:

identifying, by a region detection device, at least one storage area from at least one image based on a machine learning model, wherein the at least one image comprises the at least one product, and wherein identifying the at least one storage area comprises:
adding a first boundary box around the at least one storage area in the at least one image; and
extracting the at least one storage area from the at least one image based on the first boundary box;
identifying, by the region detection device, outer edges of the at least one storage area extracted from the at least one image;
creating, by the region detection device, at least one histogram for the at least one storage area lying within the outer edges;
identifying, by the region detection device, a plurality of boundaries within the at least one storage area based on the at least one histogram, wherein identifying the plurality of boundaries comprises applying a line detection algorithm on the at least one histogram; and
detecting, by the region detecting device, at least one region of interest based on the plurality of boundaries, wherein the at least one region of interest comprises a second boundary box that encompasses the at least one product.

2. The method of claim 1, wherein the at least one region of interest is detected based on intersection of the plurality of boundaries.

3. The method of claim 1, wherein the at least one storage area comprises at least one of fixtures, frames, shelves, racks, cabinets, or boxes.

4. The method of claim 1, wherein the at least one histogram comprises at least one of a vertical histogram, a diagonal histogram, or a horizontal histogram.

5. A region detection device for detecting regions of interest associated with at least one product from at least one image, the region detection device comprising:
at least one cameras;
a processor communicatively coupled to the at least one camera; and
a memory communicatively coupled to the processor, wherein the memory stores processor instructions, which, on execution, cause the processor to:
identify at least one storage area from the at least one image based on a machine learning model, wherein the at least one image comprises the at least one product, and wherein identifying the at least one storage area comprises:
adding a first boundary box around the at least one storage area in the at least one image; and
extracting the at least one storage area from the at least one image based on the first boundary box;
identify outer edges of the at least one storage area extracted from the at least one image;
create at least one histogram for the at least one storage area lying within the outer edges;
identify a plurality of boundaries within the at least one storage area based on the at least one histogram, wherein identifying the plurality of boundaries comprises applying a line detection algorithm on the at least one histogram; and
detect at least one region of interest based on the plurality of boundaries, wherein the at least one region of interest comprises a second boundary box that encompasses the at least one product.

6. The region detection device of claim 5, wherein the at least one region of interest is detected based on intersection of the plurality of boundaries.

7. The region detection device of claim 5, wherein the at least one storage area comprises at least one of fixtures, frames, shelves, racks, cabinets, or boxes.

8. The region detection device of claim 5, wherein the at least one histogram comprises at least one of a vertical histogram, a diagonal histogram, or a horizontal histogram.

9. A non-transitory computer-readable storage medium having stored thereon, a set of computer-executable instructions causing a computer comprising one or more processors to perform steps comprising:

identifying at least one storage area from at least one image based on a machine learning model, wherein the at least one image comprises at least one product, and wherein identifying the at least one storage area comprises:

adding a first boundary box around the at least one storage area in the at least one image; and extracting the at least one storage area from the at least one image based on the first boundary box;

identifying outer edges of the at least one storage area extracted from the at least one image;

creating at least one histogram for the at least one storage area lying within the outer edges;

identifying a plurality of boundaries within the at least one storage area based on the at least one histogram, wherein identifying the plurality of boundaries comprises applying a line detection algorithm on the at least one histogram; and detecting at least one region of interest based on the plurality of boundaries, wherein the at least one region of interest comprises a second boundary box that encompasses the at least one product.

\* \* \* \* \*